United States Patent
Trautwein

[19]

[11] Patent Number: 6,161,267
[45] Date of Patent: Dec. 19, 2000

[54] CLAMP FOR A CABLE DUCT

[75] Inventor: Bernd Trautwein, Buchloe, Germany

[73] Assignee: Hilti Aktiengesellschaft, Schaan, Liechtenstein

[21] Appl. No.: 09/320,126

[22] Filed: May 25, 1999

[30] Foreign Application Priority Data

Jun. 10, 1998 [DE] Germany ............... 198 26 035

[51] Int. Cl.$^7$ .................................................. H02G 3/04
[52] U.S. Cl. ............................................................ 24/635
[58] Field of Search ........................... 24/634, 635, 585; 174/101, 50, 135, 68.3

[56] References Cited

U.S. PATENT DOCUMENTS

| | | | |
|---|---|---|---|
| 4,727,630 | 3/1988 | Alan | 24/585 |
| 5,134,250 | 7/1992 | Caveney et al. | 174/68.3 X |
| 5,267,679 | 12/1993 | Kamaya et al. | |
| 5,274,194 | 12/1993 | Belcher | |
| 5,401,905 | 3/1995 | Lesser et al. | |
| 5,674,187 | 10/1997 | Zepf | 24/585 X |
| 5,728,976 | 3/1998 | Santucci et al. | |

FOREIGN PATENT DOCUMENTS 7931274  2/1980  Germany.

*Primary Examiner*—James R. Brittain
*Attorney, Agent, or Firm*—Brown & Wood, LLP

[57]  ABSTRACT

A clamp for a cable duct having at its open side in the region of its side wall (W) inwardly projecting strip-shaped opening edges (P) with the clamp including an elongate bridge section (2; 22), which bridges the open side of the cable duct and has a middle portion (3; 23), at least two gripping jaws (4, 5, 24, 30, 31) arranged on each of opposite sides of the middle portion, with at least one of the two gripping jaws having a hook-shaped connection portion (8, 9, 28, 36, 37) for engagement with a respective opening edge, and with the at least two gripping jaws (4, 5, 22, 30, 31) being moved against a restoring force away from each other in a direction substantially transverse to a longitudinal extent of the bridge section (2; 33) and the cable duct (C) with the aid of integrated wedge surfaces (12, 13, 32, 33, 34, 35).

11 Claims, 3 Drawing Sheets

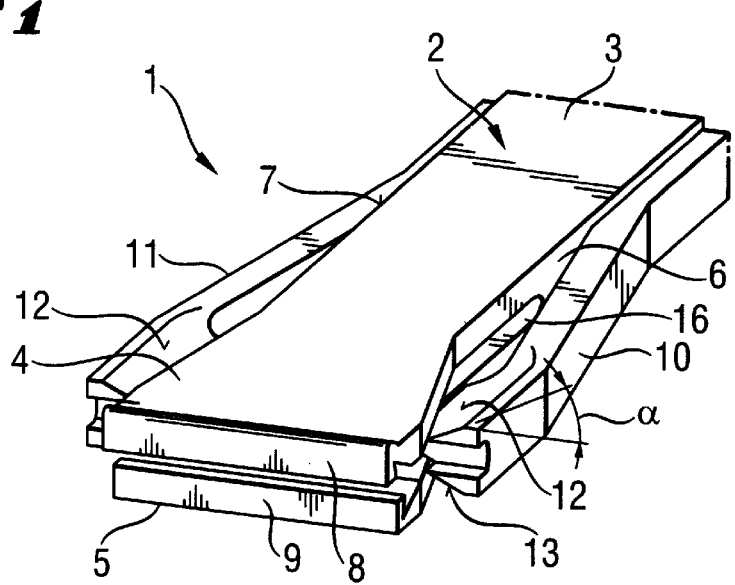
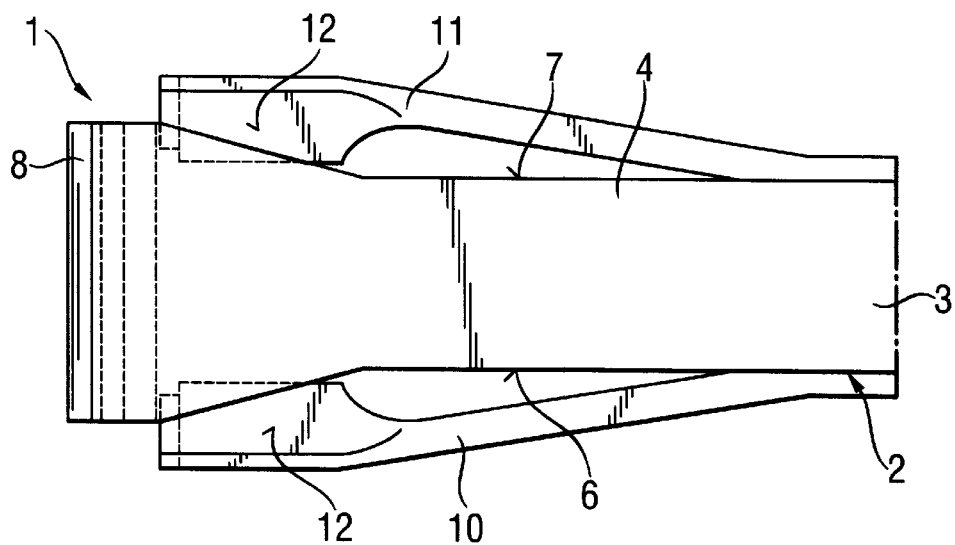
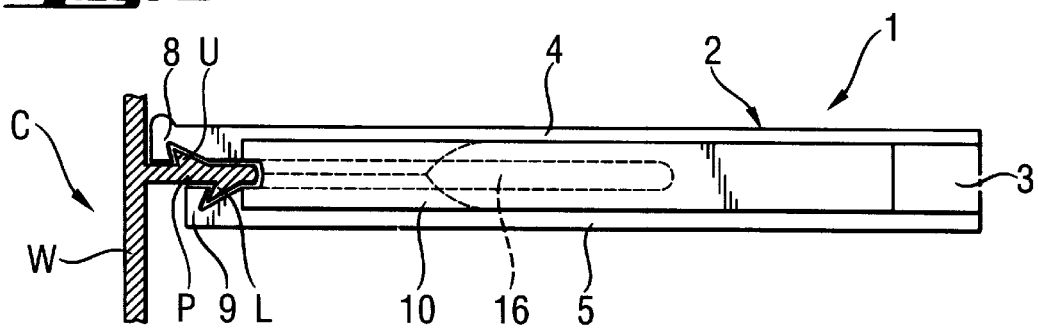

CLAMP FOR A CABLE DUCT

BACKGROUND OF THE INVENTION

1. Field of the Invention

The present invention relates to a clamp for a cable duct having, at its open side in a region of free ends of its side walls, inwardly projecting, strip-shaped opening edges with the clamp including an elongate bridge section bridging the open side of the cable duct and having a middle portion, and gripping jaws arranged on each of opposite sides of the middle portion, with at least one of the gripping jaws having a hook-shaped connection portion for engagement with a respective opening edge.

2. Description of the Prior Art

Cable ducts mentioned above are generally used for placing therein electrical cables and conductors. The cable ducts can be mounted in indentations or recesses formed in walls, ceilings, and floors. Often, the cable ducts are arranged on wall surfaces. The most often used cable ducts have a somewhat U-shaped cross-section and have a rear wall from which two side walls projects at a substantially right angle. The side of a cable duct opposite to its rear wall is open and provides for placing of a cable. Also known are so-called corner ducts which are used for being mounted in a corner formed by two butt-joined brick walls. These corner ducts have a triangular cross-section and are formed of a rear wall and two side wall projecting from the rear wall at an obtuse angle or of two side walls connected along their longitudinal sides.

The conventional cable ducts are closed with covers after a cable has been laid-in. The edges of a cover engage in undercuts formed in outer surfaces of the side walls at their free ends. The cable, which is laid in the cable duct, loads the side walls pressing them outwardly. This can cause difficulties during mounting and locking of the cover. In order to provide a better stability of the side wall, which are loaded by the placed-in cable, there are provided different clamps which bridge the opening defined by the free ends of the side wall of the cable duct and are secured on strip-shaped edges which project from the side walls inward and extend in the longitudinal direction of the cable duct.

German Utility model DE-U-79 31 274 discloses a clamp for a cable duct which is secured in elongate slots formed in the strip-shaped edges of the side walls. To this end, the clamp has, at both of its longitudinal ends, two locking fingers which are separated by an elongate slit and are provided with locking hooks which hook from beneath the edges of the elongate slots extending transverse to the longitudinal direction of the slits. The locking fingers can be pressed toward each other by forces acting transverse to the longitudinal direction of the clamp. As a result, the width of the clamp, in the region of the locking hooks, is reduced, and the locking fingers can be withdrawn from the respective longitudinal slots. A locking member, which is arranged in each slit between two locking fingers and which, when necessary, can be removed, prevent an accidental release of the clamp from the inward extending edges of the side walls.

The known clamp can only be secured in longitudinal slots, which are formed in the side wall edges at a predetermined distance from each other. Mounting the clamp at any arbitrary selected point of the cable duct, i.e., in the region of cable duct butt or cover butt is not possible. The release of a mounted clamp, e.g., for placing in of another cable, is very difficult. In order to press the locking fingers toward each other, first the locking member should be withdrawn from a respective slit. To this end, the use of both hand is necessary and, on many occasions, the use of a special tool, e.g., a screwdriver and the like is necessary for withdrawal of the locking member.

German Utility Model DE-U-295 15365 discloses a clamp having, at its longitudinal ends, somewhat U-shaped locking sections. The strip-shaped edges, which project from the side surfaces of the cable duct at their free ends inward, are provided, at least on their outer surfaces, with elongate flutes. In cooperation with corresponding flutes provided on inner surfaces of respective clamp sections, the flutes, which are provided on the side wall edges, form a flute lock. This clamp has a certain advantage in comparison with the clamp described above. It, if necessary, can be displaced along the cable duct and can be secured at any arbitrary selected location of the cable duct. The mounting of the clamp is relatively easy. However, for the removal of the clamp, e.g., to place another cable in the duct, the use of both hands is necessary for releasing the flute lock.

An object of the present invention is to provide a clamp for a cable duct which can be easily mounted at any arbitrary selected location along the longitudinal extent of the cable duct. Another object of the present invention is to provide a clamp for a cable duct that can be displaced along the cable duct to a desired position and that would prevent the cable from falling out of the duct. A further object of the present invention is to provide a clamp for a cable duct that could not be accidentally released, in particular, with a closed cable duct cover. A still further object of the present invention is to provide a clamp for a cable duct that could be simply released, at least at one of its side, with only one hand, e.g., for placing another cable into the duct. Yet another object of the present invention is to provide a clamp for a cable duct that would impart an adequate stiffness to the cable duct so that the duct dimensions would not change and the cover could be mounted with an adequate clamping force.

SUMMARY OF THE INVENTION

These and other objects of the present invention, which will become apparent hereinafter, are achieved by providing a clamp, in particular, for a cable duct which has, at its open side, in a region of free ends of its side walls, inwardly projecting, strip-shaped opening edges. The clamp includes an elongate bridge section bridging the open side of the cable duct and having a middle portion and gripping jaws arranged on each of opposite sides of the middle portion. At least one of the two gripping jaws has a hook-shaped connection portion for engagement with a respective strip-shaped opening edge. At least two-gripping jaws are provided on each side of the middle portion. With aid of integrated wedge surfaces the at least two gripping jaws can be moved against a restoring force away from each other in a direction substantially transverse to a longitudinal extent of the bridge section and the cable duct.

While the release of a conventional clamp for a cable duct, which is secured on the opening edges, is relatively cumbersome and, in majority of cases, requires the use of both hands, the clamp according to the present invention can be easily released with one hand with the aid of the wedge surfaces. When the clamp need be released, e.g., to place another cable in the duct, the wedge surfaces insure that cooperating gripping jaws, which are arranged on one side of the bridge section, move away from each other so that they can be lifted off a respective opening edge. The movement of the gripping jaws away from each other takes place against a restoring force which is generated by the elasticity of the gripping jaws and which usually retains the gripping jaws in their locking position. This insures that the mounted clamp could not be accidentally released from the side wall edges. The clamping force of the mounted clamp is sufficiently large for imparting an adequate stiffness to the cable duct so that the duct dimensions would not change, and the cover can be secured with an adequate locking force.

For insuring an easy release of the clamp according to the present invention with one hand, advantageously, the integrated wedge surfaces form with the transverse extent of the bridge section an angle between about 10° and about 45°, preferably between 15° and 35°.

In accordance with one preferred embodiment of the present invention, the integrated wedge surfaces are formed by cooperating slide surfaces which are provided on adjacent longitudinal sides of the gripping jaws. For moving the griping jaws away from each other, they need only be pressed together transverse to the longitudinal extent of the bridge section. The inclined slide surfaces slide relative to each other and provide for movement of the gripping jaws substantially transverse to the longitudinal extent of the bridge section and the cable duct and away from a respective opening edge. Thereby, no hooking of the opening edge takes place.

Though for an adequate functioning of the clamp according to the present invention, it is sufficient to provide only two cooperating gripping jaws on each of opposite sides of the middle portion of the bridge section, the locking action and handling of the gripping jaws can be further improved when on each of the opposite sides of the middle portion of the bridge section, there are provided two side gripping jaws which extend parallel to longitudinal sides of a central gripping jaw which has a substantially trapezoidal cross-section. The side gripping jaws are formed, preferably, symmetrically with respect to each other. They are arranged on opposite sides of the central gripping jaw provided with side sliding surfaces. When the side gripping jaws are pressed against the respective adjacent side surfaces of the central gripping jaw, the respective slide surfaces of the central gripping jaw and the side gripping jaws slide relative to each other. At that, the central clamping jaw will move away from a respective edge in one direction, and the side clamping jaws will move from the respective edge in an opposite direction. Thereby, the hooking will be released, and the clamp can be lifted or moved away at one side for, e.g., placing another cable in the cable duct.

According to an alternative embodiment of a clamp according to the present invention, on opposite sides of the middle portion of the bridge section, there are provided, respectively, two central gripping jaws which are arranged one above the other. Parallel to the longitudinal sides of the two, arranged one above the other, gripping jaws, there are provided expanding shackles which project from the middle portion and have each two inclined surfaces forming a V-shaped cross-section and defining the integrated wedge surfaces. The two inclined surfaces engage between the two, arranged one above the other, gripping jaws. For releasing of the central gripping jaws, it is sufficient to press the inclined sliding surfaces of the expanding shackles against the longitudinal sides of the central gripping jaws. Advantageously, the cooperating pairs of the gripping jaws have a substantially trapezoidal shape and slide surfaces which are so inclined that they form a V-shaped groove. The V-shape slide surfaces of the expanding shackles engage in the V-shaped groove and cooperate with the slide surfaces provided on longitudinal sides of the gripping jaws.

To facilitate the handling of the lamp, the portions of the longitudinal sides of the gripping jaws or the expanding shackles remote from the slide surfaces, can be provided with gripping recesses. The gripping recesses advantageously are so arranged that the gripping jaws are released with a minimal force consumption. For an adequate functioning of a clamp according to the present invention, it is sufficient when at least one of the gripping jaws on each side of the middle portion is provided with hook-shaped connection elements. For increasing the gripping action and for increasing the stiffness of the cable duct walls, advantageously, all of the gripping jaws are provided with hook-shaped connection elements or members. The connection elements are preferably formed by bent-out end sections of the gripping jaws and engage correspondingly shaped locking projections on upper or lower surfaces of the opening edges.

For functioning of the clamp, it is advantageous when the lengths of two cooperating gripping jaws are different, and the connection elements overlap locking projections which are formed on the upper or lower surface of the opening edges at different distances from a respective side wall. The shape of the clamp and of the opening edges according to the present invention facilitate securing and release of the clamp. The different lengths of the gripping jaws provide, first of all, a reliable protection against an inadvertent release of a clamp, which is lifted from a respective edge at one of its ends, from the opposite opening edge. It is particularly advantageous when in the use position, the upper gripping jaw has a greater length than the lower gripping jaw.

It is advantageous from the manufacturing and economical points of view, when the bridge section is formed of a plastic material, preferably, by injection molding.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 1 shows a perspective view of a section of a first embodiment of a clamp for a cable duct according to the present invention;

FIG. 2 shows a plan view of the clamp shown in FIG. 1;

FIG. 3 shows a side view of the clamp shown in FIG. 1 in its mounted condition;

DETAILED DESCRIPTION OF THE PREFERRED EMBODIMENTS

Figure 4:
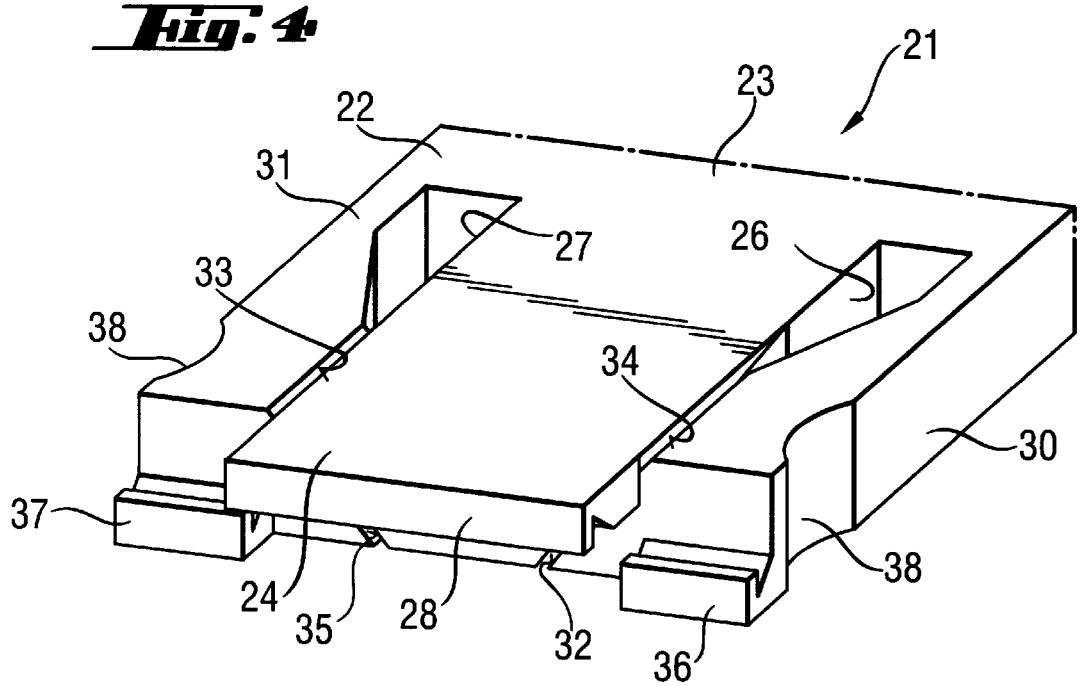
FIG. 4 shows a perspective view of a section of a second embodiment of a clamp for a cable duct according to the present invention.

A cable duct clamp according to the present invention, which is generally shown in FIGS. 1–3, is designated with a reference numeral 1. For the sake of clarity, the drawings show only a half of the longitudinal extent of the clamp 1. The second, non-shown half of the clamp, is identical with the shown half. The clamp 1 has a bridge section 2 the longitudinal extent of which, in the mounted condition of the clamp 1, extends transverse to the longitudinal extent of a cable duct C. On opposite sides of a middle portion 3 of the bridge section 2, a pair of arranged one above another gripping jaws 4, 5 extends. Hook-shaped connection parts 8, 9 are provided at respective free front ends of the gripping jaws 4, 5. The hook-shaped connection parts 8, 9 form the free ends of the gripping jaws 4, 5 which face each other. The gripping jaws 4, 5 are separated from each other by a slot 16 extending in the longitudinal direction of the bridge section 2. Two springy expanding shackles 10, 11, which project from the middle portion 3, extend somewhat parallel to the longitudinal sides 6, 7 of the gripping jaws 4, 5 respectively. In the region of their free ends, the expanding shackles 10, 11 have each V-shaped, inclined slide surfaces 12, 13 which project wedge-like in the slot 16 between the gripping jaws 4, 5.

In the mounted condition of the clamp 1, the hook-shaped connection parts 8,9 overlap locking projections U, L, which correspond to the gripping jaws 4, 5 and are provided on upper and lower sides of opening edges P of the cable duct C. The opening edges P, i.e., the edges defining the cable duct opening, project somewhat transverse from the side wall W. As shown in FIG. 3, the locking projections U, which are provided on the upper side, are strip-shaped and extend in the longitudinal direction of the opening edges P, can be arranged closer to the side wall W than the locking projections L provided on the lower sides of the opening edges P. Thereby, the clamp 1, which is shown in FIGS. 1–3, has, in its use position, an upper gripping jaw 4 which has a length greater than the lower gripping jaw 5. The locking projections U, L can be slightly undercut, as it is shown in FIG. 3. As also shown in FIG. 3, the hook-shaped connection parts 8, 9 have an outer contour which is, preferably, similar to the contour of the locking projections U, L. Therefore, the hook-shaped connection parts 8, 9 are also slightly undercut.

To be mounted on a cable duct, the clamp 1 according to the present invention is placed at a small angle on the opening edges P of the cable duct. Upon the clamp 1, which is located transverse to the longitudinal extent of the cable duct C, being pivoted back, the hook-shaped connection portions 8, 9 slide over the locking projections U, L, and the clamp 1 becomes fixed on the cable duct C. The elasticity of the gripping jaws 4, 5 is so selected that they, in their mounted and anchored condition, are secured against inadvertent displacement in the longitudinal direction of the cable duct C. For releasing the clamp 1, the expanding shackles 9, 10 are pressed manually against the longitudinal sides 6, 7 of the gripping jaws 4, 5. At that, the slide surfaces 12, 13, which extend in a wedge-like manner toward each other, penetrate into the slot 16 between the gripping jaws 4, 5. The adjacent longitudinal edges of the gripping jaws 4, 5 slide along the inclined slide surfaces 12, 13 upwardly and downwardly. Thereby, the gripping jaws 4, 5 move away from each other against an elastic restoring force in a direction substantially transverse to the longitudinal extent of the bridge section 2 and to the longitudinal extent of the cable duct C. As a result, the hooking of the hook-shaped connection portions 8, 9 with the locking projections U, L is released. After their release, the expanding shackles 10, 11 spring elastically back, and the gripping jaws 4, 5 return to their initial position in which they extend substantially parallel to each other.

In the embodiment of the clamp 1 according to the present invention, which is shown in FIGS. 1–3, both gripping jaws 4, 5 are provided at their free longitudinal ends with the hook-shaped connection portions 8, 9. It should be understood that it is sufficient for an adequate functioning of the clamp when in the use position, only the upper gripping jaw is provided with the hook-shaped connection portion. In this case, the friction between the lower gripping jaw, which abuts the lower surface of the opening edges, and the lower surface contributes to fixing of the clamp on the opening edges of the cable duct.

Figure 5:
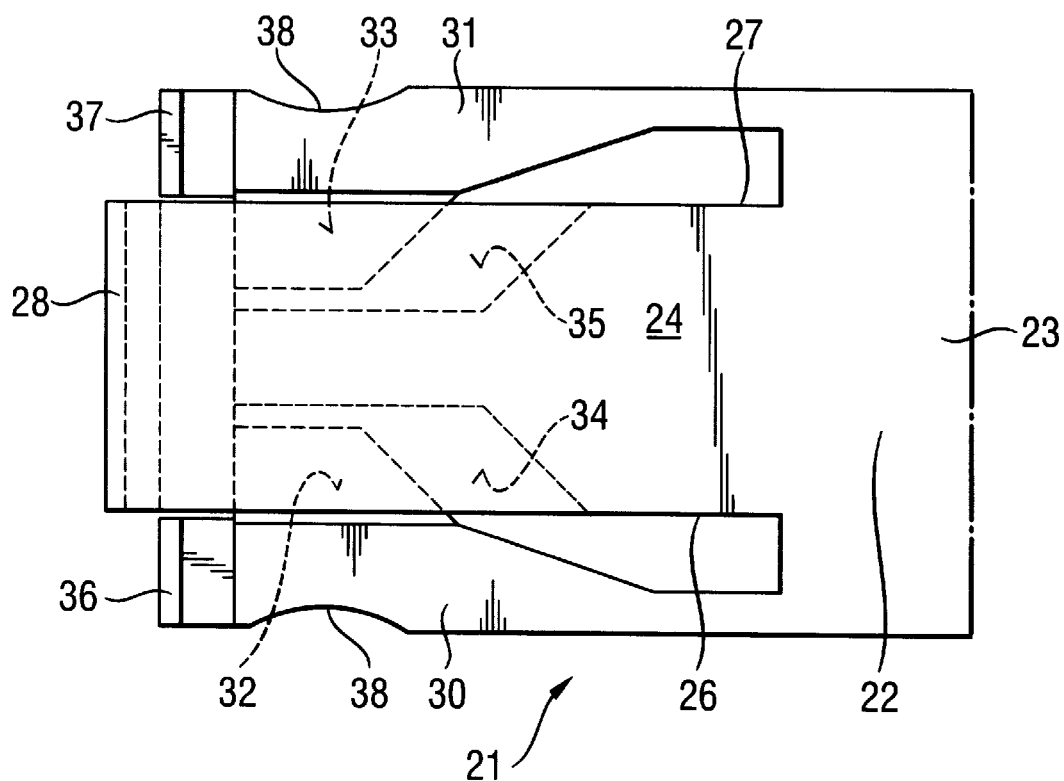
FIG. 5 shows a plan view of the clamp shown in FIG. 4.

FIGS. 4–5 show a second embodiment of a clamp for a cable duct according to the present invention. The clamp shown in FIGS. 4–5 is generally designated with a reference numeral 21. The clamp 21 has a bridge section 22 only half of which is shown in the drawings. The non-shown second half of the bridge section 22 is identical with the shown half. A central gripping jaw 24 extends on each of the opposite sides of the central portion 23 of the bridge section 22. The central gripping jaw 24 is arranged between two springy side gripping jaws 30, 31 which likewise extend form the middle portion 23 and parallel to the longitudinal sides 26, 27 of the central gripping jaw 24. The central gripping jaw 24 and both side gripping jaws 30, 31 have, at their free longitudinal ends, hook-shaped connection portions 28, 36, 37, respectively. The hook-shaped connections portions 28, 36 and 37 are formed by bent toward each other, free end of the central gripping jaw 24 and free ends of the side gripping jaws 36, 37. The central gripping jaw 24 has a substantially trapezoidal cross-section. The longitudinal sides 26, 27 of the central gripping jaw 24 have each a section in front of the hook-shaped connection portion 28 and which extends at angle outwardly inward, forming a slide surface 34, 35, respectively. The side gripping jaws 30, 31 have on their respective sides, which lie opposite the longitudinal sides 26, 27 of the central gripping jaws 24, slide surfaces 32, 33. The course of the slide surfaces 32, 33 of the side gripping jaws 30, 31 is opposite to the course of the side surfaces 34, 35 of the central gripping jaw 24. In the initial position of the clamp 21, the slide surfaces 32, 33 of the side gripping jaws 30, 31 are spaced from the slide surfaces 34, 35 of the central gripping jaw 24. The mouths of the slide surfaces 32, 33 of the side gripping jaws 30, 31 lie inside of a projection of the longitudinal sides 26, 27 of the central gripping jaw 24. At their outer sides, remote from the central gripping jaw 24, the side gripping jaws 30, 31 have each, in the region of their longitudinal ends, a gripping recess 38.

Mounting of the clamp 21 on the edges of a cable duct is effected in the same manner as the mounting of a clamp 1 shown in FIGS. 1–3. When the clamp 21 should be dismounted from the opening edges of the cable duct, a person grasps with his/her hand the gripping recesses 38 on the outer sides of the side gripping jaws 30, 31. The side gripping jaws 30, 31 are pressed against the longitudinal sides 26, 27 of the central gripping jaw 24. The inclined slide surfaces 32, 33 of the side gripping jaws 30, 31 slide along the inclined slide surfaces 34, 35 of the central gripping jaw 24. Thereby, the gripping jaws 24, 30, 31 move away from each other against a restoring force in a direction substantially transverse to the longitudinal extent of the bridge section 22, and the hooking of the hook-shaped connection portions 28, 36, 37 with the corresponding locking projections on the opening edges of the cable duct is released. The restoring force of the springy gripping jaws 24, 30, 31 is so selected the clamp 21 is prevented from an accidental displacement in the longitudinal direction of the cable duct.

Figure 6:
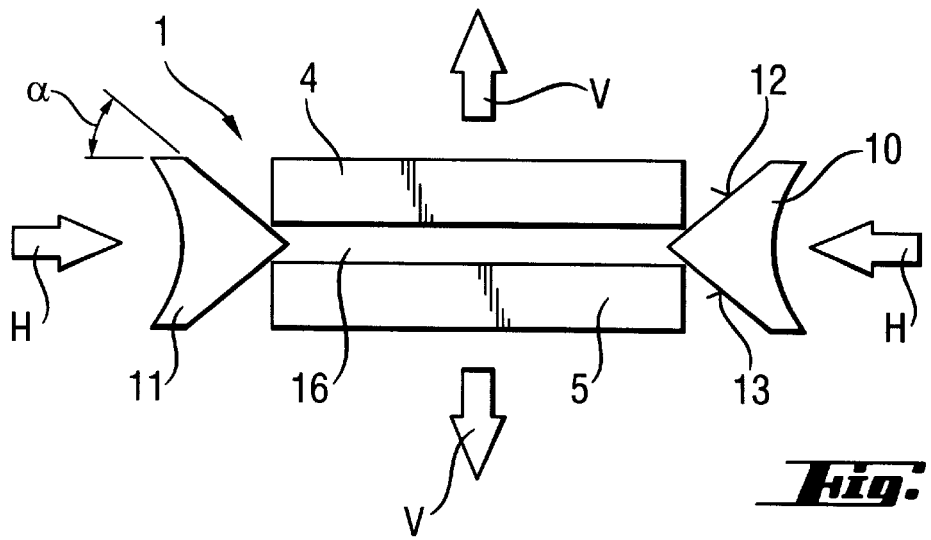
FIGS. 6–8 show operational principles of the inventive clamps.

The principle, on which the functioning of the clamp according to the present invention is based, will now be explained with reference to FIGS. 6–8. FIG. 6 shows a clamp shown in FIGS. 1–3. The gripping jaws are designated, as in the FIGS. 1–3, with reference numerals 4, 5. The expanding shackles 10, 11 are arranged on opposite longitudinal sides of the gripping jaws 4, 5 and have each slide surfaces 12, 13 which are inclined toward each other in a wedge-like manner. The wedge slide surfaces 12, 13 form with the upper surface of the gripping jaws on angle $\alpha$ which lies between about 10° and about 45°, preferably, between 15° and 35°. In the initial position, the wedge peaks only slightly extend into the slot 16 between the gripping jaws 4, 5. Upon pressing the expanding shackles 10, 11 toward each other, as shown with arrows H, the wedged slide surfaces 12, 13 penetrate further into the slot 16 between the gripping edges 4, 5. The edges of the longitudinal sides of the gripping jaws 4, 5 slide on the slide surfaces 12, 13 substantially transverse to the longitudinal extent of the clamp 1 upwardly or downwardly, as shown in FIG. 6, with double arrows V, and the gripping edges 4, 5 move away from each other.

Figure 7:
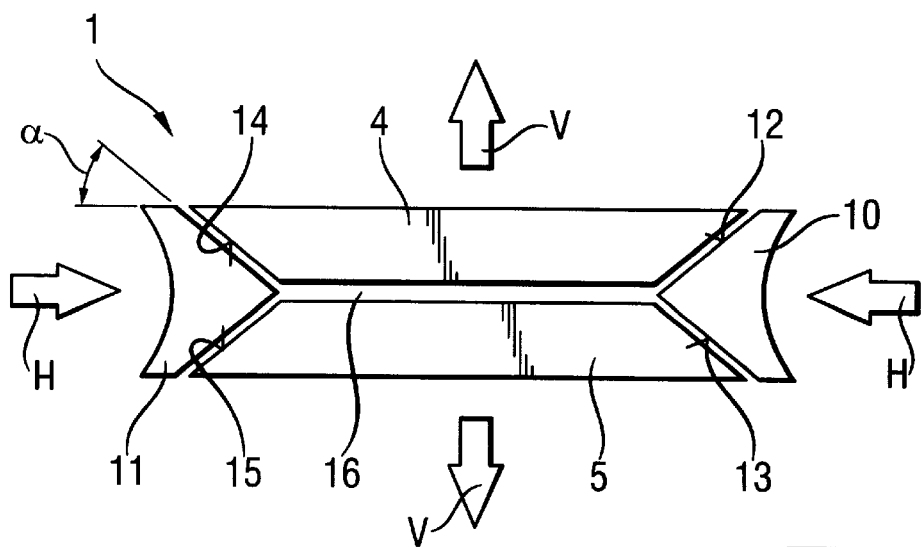

FIG. 7 shows a clamp which corresponds to the clamp 1 shown in FIGS. 1–3 and 6 to the most possible extent. The clamp, which is shown in FIG. 7, differs from the clamp 1 shown in FIGS. 1–3 and 6 in that the side surfaces of the gripping jaws 4, 5 at least partially are inclined inward and form slide surface 14, 15. The springy expanding shackles 10, 11 have slide surfaces 12, 13 arranged in a wedge-like manner and extending into V-shaped grooves which are formed by the slide surfaces 14, 15 of the gripping jaws 4, 5. When the expanding shackles 10, 11 are pressed toward each other, as shown with arrows H, the wedge peaks penetrate into the slot 16 between the gripping jaws 4, 5. The slide surfaces 12, 13 of the expanding shackles 10, 11 and the slide surface 14, 15 of the gripping jaws 4, 5 slide along each other. As a result, the gripping jaws 4, 5 move upward and downward, respectively, as shown with arrows V.

Figure 8:
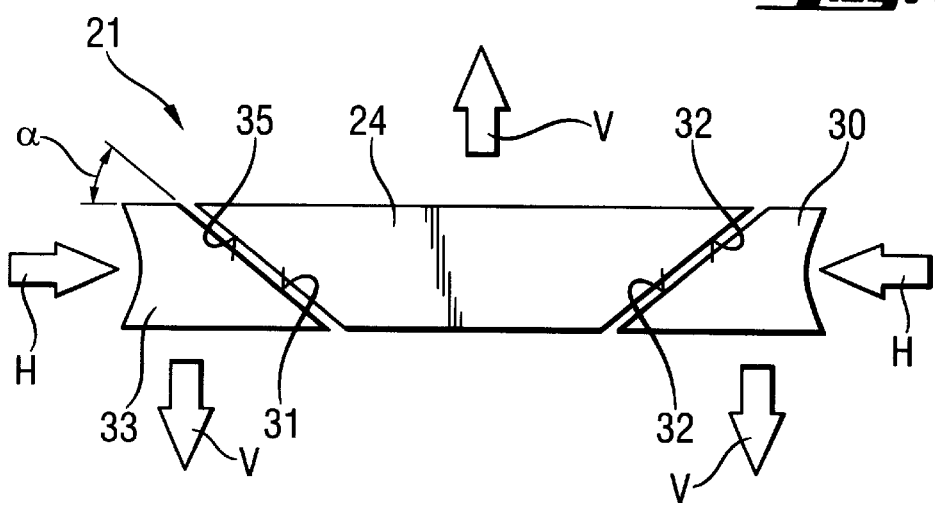

FIG. 8 illustrates a principle on which functioning of the clamp 21 shown in FIGS. 4–5 is based. The central gripping jaw 24 is arranged between two slide jaws 30, 31. The adjacent longitudinal sides of the central gripping jaw 24 and the side gripping jaws 30, 31 are provided with slide surfaces 34, 35 and 32, 33, respectively. Upon the side gripping jaws 30, 31 being pressed toward each other, as shown with arrows H, the slide surfaces 32, 33 and 34, 35 slide relative to each other. As a result, the central gripping jaw 24 moves upwardly and the side gripping jaws 30, 31 move downwardly, as shown with arrows V. While FIG. 8 illustrates the inventive principle based on an embodiment of a clamp with a central gripping jaw and two side jaws, it should be understood that the clamp according to the present invention can have only two gripping jaws arranged side by side and having adjacent side surfaces thereof provided with corresponding slopping slide surface. With two gripping jaws, upon pressing the gripping jaws toward each other, the slide surfaces slide relative to each other, with the gripping jaws moving upwardly and downwardly and away from each other. Thereby, the hooking of the hook-shaped connection portions of the respective gripping jaws with the respective locking projections, which are provided on the edges of a cable duct, is released.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A clamp for a cable duct having, at an open side thereof in a region of free ends of side walls (W) thereof, inwardly projecting, strip-shaped opening edges (P), the clamp comprising an elongate bridge section (2; 22) for bridging the open side of the cable duct and having a middle portion (3; 23); at least two gripping jaws (4, 5; 24, 30, 31) arranged on each of opposite sides of the middle portion provide the leading exposed surfaces of the clamp, with at least one of the two gripping jaws having a hook-shaped connection portion (8, 9; 28, 36, 37) for engagement with a respective opening edge; and integrated wedge surface means (12, 13; 32, 22, 23, 25) for moving the at least two gripping jaws (4, 5; 22, 30, 31) against a restoring force away from each other in a direction substantially transverse to a longitudinal extent of the bridge section (2; 22) and the cable duct (C), wherein the at least two clamping jaws (4, 5) are arranged one above another and are separated by a longitudinal slot (15).

2. A clamp according to claim 1, wherein the integrated wedge surface means includes wedge surfaces (12, 12; 32, 33, 34, 35) which form with a transverse extension of the bridge section (2; 22) an angle $\alpha$ between about 10° and about 45°.

3. A clamp according to claim 2, wherein the integrated wedge surfaces (12, 13, 32, 33, 34, 35) form with the transverse extension of the bridge section (2; 22) an angle $\alpha$ between 15° and 35°.

4. A clamp according to claim 1, wherein the integrated wedge surface means is formed by cooperating slide surfaces (32, 33, 34, 35) provided on adjacent longitudinal sides of the at least two gripping jaws (24, 30, 31).

5. A clamp for a cable duct having, at an open side thereof in a region of free ends of side walls (W) thereof, inwardly projecting, strip-shaped opening edges (P), the clamp comprising an elongate bridge section (2; 22) for bridging the open side of the cable duct and having a middle portion (3; 23); three gripping jaws (4, 5; 24, 30, 31) arranged on each of opposite sides of the middle portion, with at least one of the gripping jaws having a hook-shaped connection portion (8, 9; 28, 36, 37) for engagement with a respective opening edge; and integrated wedge surface means (12, 13; 32, 22, 23, 25) for moving the three gripping jaws (4, 5; 22, 30, 31) against a restoring force away from each other in a direction substantially transverse to a longitudinal extent of the bridge section (2; 22) and the cable duct (C), wherein the integrated wedge surface means is formed by cooperating slide surfaces (32, 33, 34, 35) provided on adjacent longitudinal sides of the at least two gripping jaws (24, 30, 31), and three gripping jaws (22, 30, 31) are located on each of the opposite sides of the middle portion (23), a central gripping jaw (24) and two side jaws (30, 31) extending substantially parallel to opposite longitudinal sides (26, 27) of the central gripping jaw (24), and wherein the central gripping jaw (24) has a substantially trapezoidal cross-section.

6. A clamp according to claim 5, wherein the side gripping jaws (30, 31) have on sides thereof remote from the central gripping jaw (24) gripping recesses (28).

7. A clamp for a cable duct having, at an open side thereof in a region of free ends of side walls (W) thereof, inwardly projecting, strip-shaped opening edges (P), the clamp comprising an elongate bridge section (2; 22) for bridging the open side of the cable duct and having a middle portion (3; 23); at least two gripping jaws (4, 5; 24, 30, 31) arranged on each of opposite sides of the middle portion, with at least one of the two gripping jaws having a hook-shaped connection portion (8, 9; 28, 36, 37) for engagement with a respective opening edge; and integrated wedge surface means (12, 13; 32, 22, 23, 25) for moving the at least two gripping jaws (4, 5; 22, 30, 31) against a restoring force away from each other in a direction substantially transverse to a longitudinal extent of the bridge section (2; 22) and the cable duct (C), wherein the at least two clamping jaws (4, 5) are arranged one above another and are separated by a longitudinal slot (15), wherein the clamp further comprises elastic expanding shackles (10, 11) projecting from the middle portion (3), arranged on opposite longitudinal sides of the gripping jaws (4, 5) and extending substantially parallel thereto, and wherein the integrated wedge surface means is (12, 13) are formed by inclined toward each other surfaces provided on each of the shackles (10, 11) and forming a V-shaped cross-section, the inclined toward each other surfaces (12, 13) of respective shackles (10, 11) cooperating with the longitudinal sides (6, 7) of the two gripping jaws (4, 5).

8. A clamp according to claim 7, wherein the two gripping jaws (4, 5) have a substantially trapezoidal cross-section, and wherein longitudinal sides (6, 7) of the two gripping jaws (4,5) are provided with inclined toward each other slide surfaces (14, 15) which limit a substantially V-shaped groove.

9. A clamp for a cable duct having, at an open side thereof in a region of free ends of side walls (W) thereof, inwardly projecting, strip-shaped opening edges (P), the clamp comprising an elongate bridge section (2; 22) for bridging the open side of the cable duct and having a middle portion (3; 23); at least two gripping jaws (4, 5; 24, 30, 31) arranged on each of the opposite sides of the middle portion and integrated wedge surface means (12, 13; 32, 22, 23, 25) for moving the at least two gripping jaws (4, 5; 22, 30, 31) against a restoring force away from each other in a direction substantially transverse to a longitudinal extent of the bridge section (2; 22) and the cable duct (C), wherein the gripping jaws (4, 5, 24, 30, 31) are provided with hook-shaped connection portions (8, 9, 28, 36, 37), which are formed by bent end sections of the gripping jaws (4, 5, 24, 30, 31), for overlapping respectively shaped locking projections (U, L) formed on upper and lower sides of the opening edges (P).

10. A clamp according to claim 9, wherein the at least two gripping jaws (4, 5, 24, 30, 31) have different length, with the respective hook-shaped connection portion (8, 9, 28, 36, 37) designed for overlapping of the locking projections (U, L) spaced a different distance from associated side walls (W) of the cable duct (C).

11. A clamp according to claim 9, wherein the at least two gripping jaws (4, 5) are arranged one above another, and an upper (4) of the two gripping jaws has a greater length than a lower (5) of the two gripping jaws.

\* \* \* \* \*